United States Patent
Goyne et al.

(10) Patent No.: US 7,612,775 B2
(45) Date of Patent: Nov. 3, 2009

(54) REAL-TIME CONFORMAL TERRAIN RENDERING

(75) Inventors: Linda J Goyne, Florissant, MO (US); Ken L Bernier, O'Fallon, MO (US); Jeremy D Childress, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 436 days.

(21) Appl. No.: 11/191,621

(22) Filed: Jul. 28, 2005

(65) Prior Publication Data

US 2007/0024616 A1    Feb. 1, 2007

(51) Int. Cl.
*G06T 17/20* (2006.01)
*G06T 15/10* (2006.01)
*G06T 15/20* (2006.01)
*G06F 15/80* (2006.01)
*G06T 1/20* (2006.01)

(52) U.S. Cl. .................. 345/423; 345/427; 345/502; 345/503; 345/504; 345/506

(58) Field of Classification Search .............. 345/423, 345/502, 503, 506, 504, 427; 701/3, 211, 701/301
See application file for complete search history.

(56) References Cited

U.S. PATENT DOCUMENTS

| | | | | |
|---|---|---|---|---|
| 5,179,638 A | * | 1/1993 | Dawson et al. | 345/582 |
| 5,808,617 A | * | 9/1998 | Kenworthy et al. | 345/421 |
| 5,852,443 A | * | 12/1998 | Kenworthy | 345/441 |
| 5,949,428 A | * | 9/1999 | Toelle et al. | 345/589 |
| 5,974,423 A | * | 10/1999 | Margolin | 345/606 |
| 5,990,904 A | * | 11/1999 | Griffin | 345/631 |
| 6,208,997 B1 | * | 3/2001 | Sigeti et al. | 707/104.1 |

(Continued)

OTHER PUBLICATIONS

Lindstrom, P. et al., "Visualization of large terrains made easy" Proceedings of the Conference on Visualization '01, Oct. 21-26, 2001, Visualization, IEEE Computer Society, Washington, DC, pp. 363-371.*

(Continued)

*Primary Examiner*—Ulka Chauhan
*Assistant Examiner*—Roberta Prendergast
(74) *Attorney, Agent, or Firm*—Harness, Dickey & Pierce, P.L.C.

(57) ABSTRACT

A method for rendering a real-time conformal view of terrestrial body's terrain being traversed by a mobile platform includes storing digital terrain elevation data (DTED) tiles for at least a portion of the terrain of a terrestrial body into an external removable mass data storage device (ERMDSD). The ERMDSD is connectable to an onboard computer system (OCS) comprising embedded mobile platform components that include at least one processing card, at least random access memory (RAM) device and at least one graphics card. The method additionally includes executing a real-time rendering assist application (RTRAA) stored in the processing card to dynamically repackage the DTED tiles into DTED chunks being representative of an area of the terrestrial body to be traversed (ATBT) by the mobile platform. The method further includes executing the RTRAA to create a base mesh of root diamonds representative of the ATBT and tessellate the root diamonds to create a plurality of leaf diamonds. Further yet the method includes utilizing the graphics card only to render the leaf diamonds, thereby generating a real-time conformal view of the ATBT.

22 Claims, 2 Drawing Sheets

U.S. PATENT DOCUMENTS

| | | | | |
|---|---|---|---|---|
| 6,288,721 | B1* | 9/2001 | Donoghue et al. | 345/426 |
| 6,317,690 | B1* | 11/2001 | Gia | 701/301 |
| 6,342,884 | B1* | 1/2002 | Kamen et al. | 345/423 |
| 6,359,624 | B1* | 3/2002 | Kunimatsu | 345/503 |
| 6,401,038 | B2* | 6/2002 | Gia | 701/301 |
| 6,525,726 | B1* | 2/2003 | Xie et al. | 345/421 |
| 6,567,087 | B1* | 5/2003 | Reid | 345/428 |
| 6,600,489 | B2* | 7/2003 | Cook | 345/426 |
| 6,674,433 | B1* | 1/2004 | Junkins | 345/423 |
| 6,700,573 | B2* | 3/2004 | Freeman | 345/422 |
| 6,714,196 | B2* | 3/2004 | McCormack et al. | 345/423 |
| 6,856,320 | B1* | 2/2005 | Rubinstein et al. | 345/543 |
| 6,862,501 | B2* | 3/2005 | He | 701/3 |
| 6,906,716 | B2* | 6/2005 | Moreton et al. | 345/423 |
| 6,980,224 | B2* | 12/2005 | Wiant, Jr. | 345/629 |
| 7,027,046 | B2* | 4/2006 | Zhang | 345/419 |
| 7,081,903 | B2* | 7/2006 | McNamara et al. | 345/614 |
| 7,123,260 | B2* | 10/2006 | Brust | 345/428 |
| 7,239,311 | B2* | 7/2007 | Dunn et al. | 345/419 |
| 7,245,299 | B2* | 7/2007 | Sfarti | 345/423 |
| 7,436,405 | B2* | 10/2008 | Petterson et al. | 345/428 |
| 2001/0023390 | A1* | 9/2001 | Gia | 701/301 |
| 2001/0047229 | A1* | 11/2001 | Staggs | 701/3 |
| 2002/0060685 | A1* | 5/2002 | Handley et al. | 345/582 |
| 2002/0080145 | A1* | 6/2002 | Ishihara | 345/589 |
| 2002/0101419 | A1* | 8/2002 | Cook | 345/426 |
| 2002/0130857 | A1* | 9/2002 | Perry et al. | 345/420 |
| 2002/0135591 | A1* | 9/2002 | Zhang | 345/582 |
| 2003/0023354 | A1* | 1/2003 | Brust et al. | 701/3 |
| 2003/0080960 | A1* | 5/2003 | Chang | 345/423 |
| 2003/0085896 | A1* | 5/2003 | Freeman | 345/428 |
| 2003/0151602 | A1* | 8/2003 | Sadowsky et al. | 345/419 |
| 2004/0061726 | A1* | 4/2004 | Dunn et al. | 345/855 |
| 2004/0083038 | A1* | 4/2004 | He | 701/3 |
| 2004/0227755 | A1* | 11/2004 | Sfarti | 345/423 |
| 2005/0264566 | A1* | 12/2005 | Sommers | 345/423 |
| 2008/0049018 | A1* | 2/2008 | Sfarti | 345/423 |

OTHER PUBLICATIONS

Lindstrom, P., et al., "Real-time, continuous level of detail rendering of height fields", Proceedings of the 23rd Annual Conference on Computer Graphics and interactive Techniques, SIGGRAPH '96, ACM, New York, NY, pp. 109-118.*

Hwa, et al., "Adaptive 4-8 Texture Hierarchies", Proceedings of the Conference on Visualization '04, Oct. 10-15, 2004, IEEE Visualization. IEEE Computer Society, Washington, DC, pp. 219-226.*

Duchaineau, et al., "ROAMing terrain: real-time optimally adapting meshes", Proceedings of the 8th Conference on Visualization '97, Oct. 18-24, 1997, R. Yagel and H. Hagen, Eds., IEEE Visualization, IEEE Computer Society Press, pp. 81-88.*

Döllner, J., et al., "Texturing techniques for terrain visualization", Proceedings of the Conference on Visualization '00, Oct. 8-13, 2000, IEEE Visualization, IEEE Computer Society Press, Los Alamitos, CA, pp. 227-234.*

Mark Duchaineau, "ROAM Algorithm Version 2", Feb. 20, 2003, Google Results, 24 pages, http://www.cognigraph.com/ROAM_homepage/ROAM2/.*

Ming Fan, et al., "A review of real-time terrain rendering techniques", Proceedings of the 8th International Conference on Computer Supported Cooperative Work in Design, vol. 1, May 26-28, 2004, pp. 685-691.*

Gregorski, B., et al., "Interactive view-dependent rendering of large isosurfaces", Proceedings of the Conference on Visualization '02, Oct. 27-Nov. 1, 2002, Visualization, IEEE Computer Society, Washington, DC, pp. 475-484.*

H.Hakl, L.Van Zijl, "Diamond Terrain Algorithm: Continuous Levels of Detail for Height Fields", South African Computer Journal, Issue 29, 2002, pp. 1-17.*

Levenberg, J., "Fast view-dependent level-of-detail rendering using cached geometry", Proceedings of the Conference on Visualization '02, Oct. 27-Nov. 1, 2002, Visualization, IEEE Computer Society, Washington, DC, pp. 259- 266.*

Lindstrom, P. et al., "Visualization of large terrains made easy" Proceedings of the Conference on Visualization '01, Oct. 21-26, 2001, Visualization, IEEE Computer Society, Washington, DC, pp. 363-371.*

Lindstrom, P., et al., "Real-time, continuous level of detail rendering of height fields", Proceedings of the 23rd Annual Conference on Computer Graphics and interactive Techniques, SIGGRAPH '96, Aug. 1996, ACM, New York, NY, pp. 109-118.*

ROAMing Terrain: Real-time Optimally Adapting Meshes. Proc. Visualization '97, p. 81-88. IEEE Computer Society Press, Oct. 1997, Duchaineau, Wolinsky, Sigeti, Miller, Aldrich and Mineev-Weinstein.

MIL-PRF-89020A, Performance Specification, Digital Terrain Elevation Data (DTED), Apr. 1999.

ROAM Algorithm-the Diamond Data Stucture. Mark Duchaineau, Feb. 2003.

* cited by examiner

REAL-TIME CONFORMAL TERRAIN RENDERING

GOVERNMENT RIGHTS

This present disclosure was made with Government support under contract number F33615-00-C-6061 awarded by the United States Air Force. The Government has certain rights in this disclosure.

FIELD

The present disclosure relates generally to mobile platform guidance systems. More particularly, the disclosure relates to three dimensional (3D) terrain rendering for pilot displays.

BACKGROUND

Situation awareness displays, such as helmet-mounted displays, are rapidly becoming required elements of several existing and future mobile platforms and programs. Conformal views of digital terrain data provide a significant increase in almost any situation awareness application. Although several 3D terrain rendering products are available today, they require high-performance rendering hardware not available for flight-worthy applications.

Providing 3D terrain displays involves not only the rendering algorithms, but also involves managing and moving large amounts of data between storage media and rendering processor memory. Mission requirements typically drive the need for removable storage media, and flight-worthy hardware typically requires this to be solid-state storage. Operational requirements drive the need for multiple simultaneous views of similar or differing geographical areas, as well as overlaying terrain with 2D and 3D graphical symbols depicting pathways, obstacles, threats, flight data, etc.

However, the pre-existing low-performance embedded hardware platforms, i.e. older technology hardware currently installed on most mobile platforms, are not capable of providing such 3D terrain displays. Generally, to provide such realtime conformal terrain graphics to fast moving helmet mounted displays requires managing several gigabytes of data and updating the display approximately 30-60 times per second. The known pre-existing embedded hardware is not capable of processing such large volumes of data at speeds necessary to provide real-time 3D terrain rendering for fast-moving helmet mounted displays.

BRIEF SUMMARY

In various embodiments of the present disclosure, a method for rendering a real-time conformal view of terrestrial body's terrain being traversed by a mobile platform is provided. The method includes storing digital terrain elevation data (DTED) tiles for at least a portion of the terrain of a terrestrial body into an external removable mass data storage device (ERMDSD). The ERMDSD is then connected to an onboard computer system (OCS) of a mobile platform. The OCS comprises embedded mobile platform components that include at least one processing card, at least one random access memory (RAM) device and at least one graphics card. The method additionally includes executing a real-time rendering assist application (RTRAA) stored in the processing card to dynamically repackage the DTED tiles into DTED chunks being representative of an area of the terrestrial body to be traversed (ATBT) by the mobile platform. The RTRAA additionally loads the DTED chunks into an electronic storage device of the processing card. The method further includes executing the RTRAA to create a base mesh of root diamonds representative of the ATBT, the base mesh being stored in the RAM device. Execution of the RTRAA tessellates the root diamonds to create a plurality of leaf diamonds derived from the DTED chunks. Further yet the method includes executing a rendering application included in the graphics card to render the leaf diamonds to generate a real-time conformal view of the ATBT.

The features, functions, and advantages of the present disclosure can be achieved independently in various embodiments of the present disclosure or may be combined in yet other embodiments.

BRIEF DESCRIPTION OF THE DRAWINGS

The present disclosure will become more fully understood from the detailed description and accompanying drawings, wherein.

Corresponding reference numerals indicate corresponding parts throughout the several views of drawings.

DETAILED DESCRIPTION

The following description of the various embodiments is merely exemplary in nature and is in no way intended to limit the present disclosure, its application or uses. Additionally, the advantages provided by the various embodiments, as described below, are exemplary in nature and not all embodiments provide the same advantages or the same degree of advantages.

Figure 1:
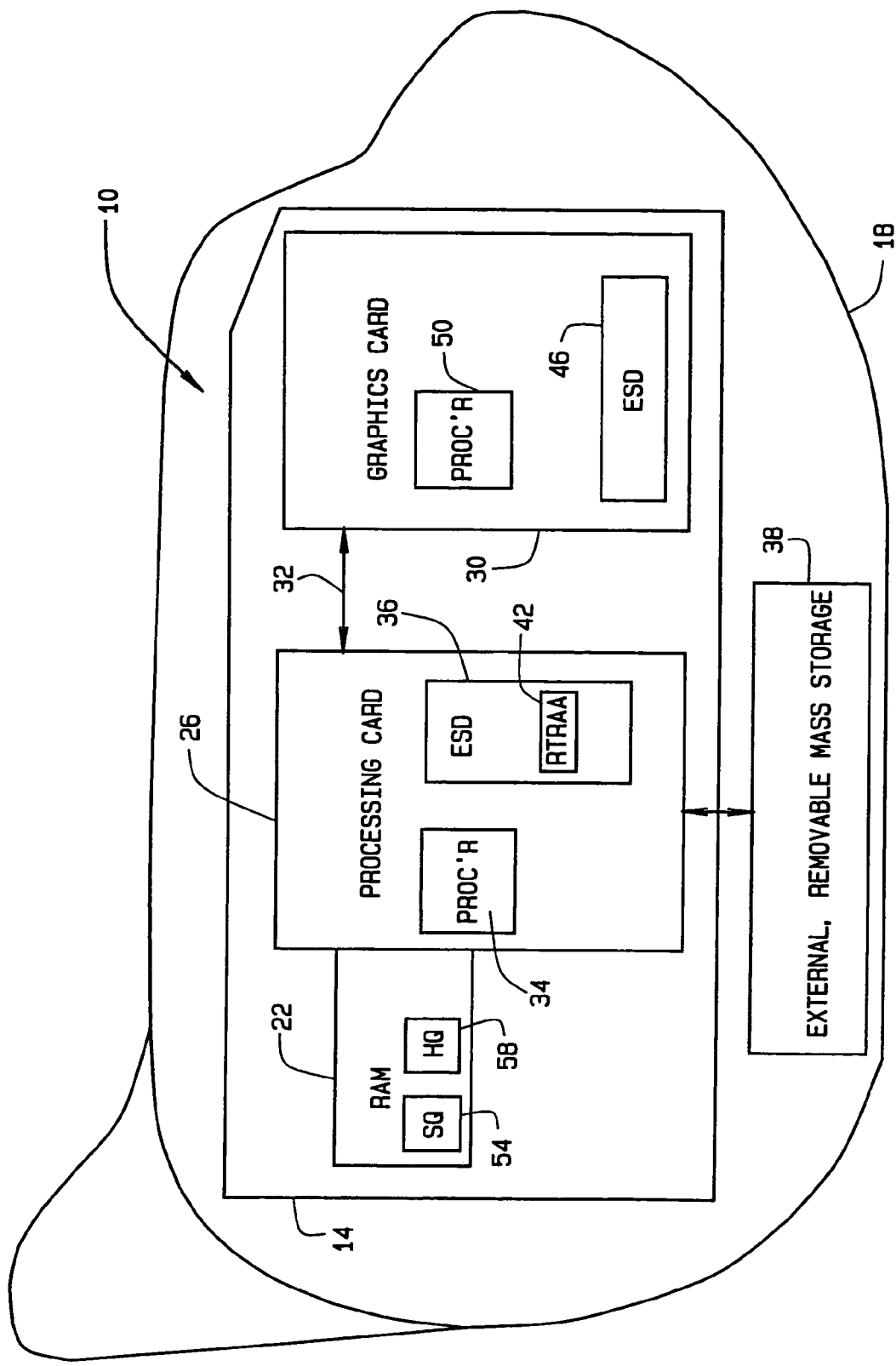
FIG. 1 is a block diagram of a real-time rendering assist system, in accordance with various embodiments of the present disclosure.

Referring to FIG. 1, in accordance with various embodiments of the present disclosure, a real-time rendering assist system 10 is provided to render conformal terrain views to pilot displays. Generally, the conformal view provides an overlay of the actual terrain that a mobile platform is traversing onto what the pilot actually sees through the cockpit windows. There is a one-to-one correspondence with what the pilot sees in the display versus what the pilot sees through the cockpit windows. More particularly, the realtime rendering assist system 10 provides a perspective view of 3-D terrain in such a way that that terrain is conformal with the real world situation, whereas a perspective view means things are scaled in an appropriate fashion to make them look realistic. Therefore, if a pilot's view of the actual terrain is impaired, e.g. by clouds, fog or darkness, the conformal terrain view will display a graphical rendering of the actual terrain that the pilot can not see.

The real-time rendering assist system 10 includes an existing onboard computer system (OCS) 14 of a mobile platform 18. Although the mobile platform 18 is illustrated as an aircraft, the present disclosure is not limited to aircraft, but is applicable to all mobile platforms such as aircraft, ships, buses, trains and automobiles. The OCS 14 includes at least one random access memory (RAM) device 22 and least one processing card 26 that is communicatively linked to at least one graphics card 30, via a data bus 32. The processing card 26 includes at least one processor 34 and at least one electronic storage device (ESD) 36, for example a second RAM device. It should be understood that the OCS 14 and all components of the OCS 14, e.g. the RAM, processing card and graphics card 22, 26 and 30, are standard, embedded, i.e. older technology, components typically installed in most of today's mobile platform. Particularly, in various embodiments, the OCS 14 is an existing, installed onboard computer system of the mobile platform 18 and the remaining component(s) of the present disclosure, as described below, are retrofit with the existing installed OCS 14 to provide the methods and system of the present disclosure.

The real-time rendering assist system 10 additionally includes an external removable mass data storage device (ERMDSD) 38 that is adapted to removably connect with the OCS 14 to establish a communication link with the processing card 26. The ERMDSD 38 can be any suitable computer readable, removable, mass storage medium for electronically storing data, for example a solid state mass storage device such as a PCMCIA card. The processor 34 is adapted to execute all functions of the processing card 32. For example, the processor 34 is adapted to access the RAM 32 and the ESD 36 and to execute a real-time rendering assist application (RTRAA) 42 stored on the processing card ESD 36. In various embodiments, the processor 34 accesses the RAM device 22 via a PCI bus (not shown) and is divided into a plurality of windows, e.g. 256 MB windows, that can be used one at a time and do not slide. Additionally, the graphics card 30 includes an electronic storage device 46, e.g. a third RAM device, and a processor 50 adapted to render tessellated data stored on the graphics card ESD 46, as described below.

Figure 2:
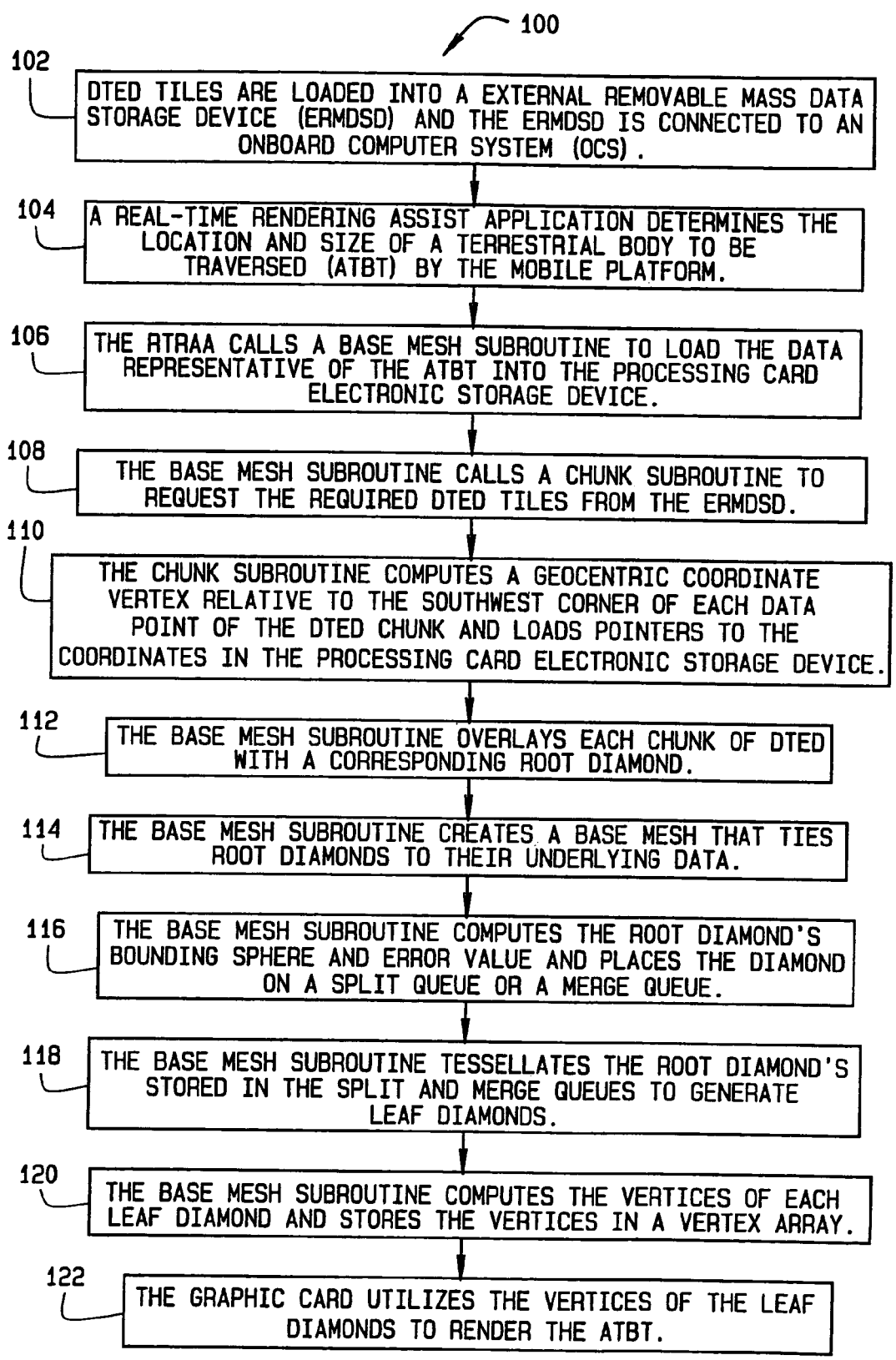
FIG. 2 is a flow chart illustrating a process for rendering a real-time conformal view of terrain being traversed by a mobile platform utilizing the realtime rendering assist system shown in FIG. 1.

FIG. 2 is a flow chart 100 illustrating a method for providing a real-time conformal view of terrain being traversed by the mobile platform 18 to a pilot of the mobile platform 18 utilizing the real-time rendering assist system 10, shown in FIG. 1. Generally, to provide the real-time conformal view, digital terrain elevation data (DTED) is loaded into the real-time rendering assist system 10 from a storage media, then at least one non-graphics processing card tessellates the DTED data and communicates the tessellated data to a graphics card. That is, the DTED data is 'pre-tessellated' and transmitted to the graphics card such that the graphics card does not perform any tessellation, but merely renders the pre-tessellated data.

DTED is a collection of tiles representing areas of a mathematical representation of a terrestrial body, such as the earth. The tiles are stored as files in a pre-defined directory structure and are generally accessed by latitude and longitude. Each tile covers a one degree square area bounded by whole degree latitude and longitude lines and referenced by its southwest corner. A tile contains a discrete number of grid points whose value is the elevation in meters at the corresponding location. Rows correspond to longitude, ascending from west to east and columns correspond to latitude, ascending from south to north. Grid intervals are defined in terms of arc seconds, and the number of points in a row varies with latitude, due to the fact that longitudinal lines converge at the poles. For example, a Level 1 DTED tile contains elevations spaced 3 arc seconds apart (~100 m). A tile located within the +/-0-50 degrees latitude band contains 1201×1201 posts, but a tile located between +/-50-70 degrees contains only 601×1201 posts.

As illustrated at 102, the DTED is transferred from a storage media, e.g. data CDs, zip drive, thumb drive, wired or wireless download from remote server system, to a large external storage device the ERMDSD 38 and the ERMDSD 38 is connected to the OCS 14. The RTRAA 42, stored on the processing card ESD 42, is executed by the processing card processor 34 to determine the location and size of the area to be rendered based on the current view frustum and related parameters such as mobile platform position, heading velocity or head motion for a helmet mounted display on which the conformal view will be rendered, as indicated at 104. Generally, the area to be rendered is the area of the terrestrial body, e.g. earth, to be traversed (ATBT) by the mobile platform 18. The RTRAA 42 calls a base mesh subroutine included in the RTRAA 42 to load the data representative of the desired area to be rendered into the processing card ESD 36, based on latitude, longitude and elevation of the mobile platform, as indicated at 106.

The base mesh routine then calls a chunk subroutine included in the RTRAA 42 to request the required DTED tiles, as indicated at 108. However, the DTED tiles are data packets having sizes that are not easily interpretable or manageable by the graphics card. Therefore, the chunk subroutine locates the desired DTED tiles and dynamically repackages or reformats the DTED tiles into DTED chunks representative of the desired area to be rendered that are easily interpretable/manageable by the graphics card. To locate and repackage the desired DTED tiles the chunk subroutine calls a DTED subroutine included in the RTRAA 42 to request the required DTED tiles. The DTED subroutine loads the required DTED tiles from the ERMDSD 38 and returns pointers for the requested tiles to the chunk subroutine. The chunk subroutine then repackages/reformats the underlying DTED tiles into the requested DTED chunks that are easily interpretable/manageable by the graphics card.

The chunk subroutine computes a geocentric coordinate vertex for each data point/grid in the DTED chunk and loads the DTED chunk into the base mesh subroutine, as indicated at 110. Particularly, the chunk subroutine utilizes the latitude, longitude and elevation data of the mobile platform 18 to compute the geocentric coordinate vertices relative to the southwest corner of each data point/grid in the DTED chunk. The chunk subroutine loads the DTED chunk into the base mesh subroutine by returning a pointer to the DTED chunk, now consisting of geocentric coordinate vertex data, to the base mesh subroutine. The unit of drawing in graphics hardware is generally the triangle. In terms of processing, however, work is done on the basis of diamonds that consist of two right-isosceles triangles joined at a common base edge. In accordance with various embodiments of the present disclosure, the base mesh subroutine overlays each DTED chunk with one diamond, known as the root diamond, as indicated at 112. That is, the base mesh routine activates the corresponding root diamond. Each root diamond has five vertices, one at each of four corners of the data chunk and one in the center. The base mesh subroutine creates a base mesh that ties the root diamonds to their underlying data, as indicated at 114. Thus, the base mesh includes a matrix of root diamonds that represent terrain data covering the area of the terrestrial body's surface desired to be rendered. Each rendered view of DTED has its own base mesh, which is the mechanism that allows multiple views of DTED at potentially different points. The base mesh subroutine may load one or more root diamonds into the base mesh, depending on the size of the viewable area, e.g. the ATBT, but only one is considered the base diamond. The base diamond is used to set the current origin of the base mesh and has priority over the other root diamonds during tessellation.

The base mesh subroutine then computes a bounding sphere and error value for each root diamond, places the root diamond on a split queue 54 or merge queue 58 in the RAM device 22, and returns a pointer for the root diamond to the RTRAA 42, as indicated at 116. The bounding sphere is the smallest sphere that encompasses the entire diamond and is used to determine whether or not the diamond is within the view frustum. The error value takes into account the difference between an actual height value of each root diamond and an interpolated height value of each root diamond calculated using the values of two corners of each respective root diamond. The error value also takes into account the width of each diamond and is used to decide whether or not a diamond should be split or merged, as described below. The split and merge queues 54 and 58 are used to facilitate the splitting and merging of diamonds.

The process of representing a portion of the terrestrial body's, e.g. earth's, surface as a contiguous mesh of triangles is called tessellation. Starting with the root diamond(s), the base mesh subroutine tessellates each diamond stored in the split and merge queues 54 or 58, as indicated at 118. In various embodiments, during the tessellation process, the diamond(s) is/are recursively split into four child diamonds, so that each diamond has two parents and four children. Each diamond is given a relative priority, which takes into account such things as whether or not it is in view, its size relative to the underlying data, and the differences between elevations within the diamond. The diamond is then placed on the appropriate split or merge queue 54 or 58. In an exemplary embodiment, the base mesh subroutine employs a real-time optimally adapting meshes (ROAM) algorithm to compute the bounding sphere and error values, place the root diamond on a split queue 54 or merge queue 58, and perform the tessellation process. Alternatively, the base mesh subroutine can employ any other algorithm suitable to tessellate, i.e. split, the diamonds without departing from the scope of the present disclosure.

The diamonds are split until they are the same granularity as the underlying data. That is, the diamonds are split until the smallest diamond, called a leaf diamond, has one grid point at each corner and only one in the center. Only leaf diamonds, i.e. diamonds that are not split, are actually rendered by the graphics card 30. Diamonds may also be merged back together, for example to represent an expanse of flat terrain or because they are no longer in view.

Generally, the tessellation process determines which diamonds should be split and which diamonds should be merged together because they may be too small or detailed. If the diamond is too small such that the diamond would not be seen on the screen, the RTRAA 42 merges the small diamonds to make a bigger diamond. As described above, the error value is utilized during the tessellation process to determine whether a diamond should be split to provide more detail during the rendering process. For example, if an aircraft is flying over mountainous terrain, there will be a lot of height difference within a diamond. Therefore, the diamond will be split into smaller diamonds to provide more details when the diamonds are rendered by the graphics card 30. The diamonds are split until the resulting diamonds have one grid point at each corner and only one in the center, i.e. leaf diamonds or leaf nodes.

More specifically, during tessellation, the base mesh subroutine first determines which diamonds should be culled. Each diamond inherits the state of one of its ancestors, specifically its quad-tree parent. If the parent is completely inside or outside of the frustum, the diamond and all its children are considered to have the same status, and no further processing is necessary. However, if the parent is partially inside the frustum the diamond's bounding sphere must be evaluated. Depending on how its state has changed from frame to frame, the diamond may be placed on the split or merge queue 54 or 58. Once cull flags have been updated and diamonds have been placed on the split or merge queue 54 or 58 as appropriate, the base mesh subroutine updates the priority value for each queued diamond. Each diamond's priority is based on its error value and its distance from an eye point of a viewer, e.g.

the mobile platform operator. After reprioritizing the queued diamonds, splits and merges are actually performed, starting with the highest priority diamonds. This process continues to add to or reconfigure the base mesh until the maximum leaf diamond count has been reached, or the desired fineness is achieved, or a certain number of diamonds have been processed.

The base mesh is then traversed to find all its leaves, i.e. the diamonds that have no children. Once found, the base mesh subroutine computes the vertices of each leaf diamond's triangles relative to the origin of the base mesh and stores the vertices in a vertex array in the processing card ESD 36, as indicated at 120. When this process is complete, the vertex array is ready to be rendered by the graphics card 30. In various embodiments, the vertex array is transferred from the processing card ESD 36 to memory on the graphics card ESD 46 in segments or pieces. That is, the RTRAA 42 breaks the vertex array into several small pieces, e.g. 256 KB, to send the vertex array and reassembles the vertex array on the graphics card ESD 46. The process of transferring the vertex array to the graphics card ESD 46 in pieces uses bandwidth of the data bus 32 more efficiently and avoids stalling of the data bus 32. While the RTRAA 42 transfers the vertex array to the graphics card ESD 46, higher priority data transfers are allowed to interrupt the vertex array transfer. In other words, transferring a large vertex array will not lock out the regular transfer of data that may be changing at much higher rates.

Once the vertex array has been transferred to the graphics card ESD 46, the graphics card 30 executes the rendering application to render the vertex array, as indicated at 122. For example, the graphics card processor 50 can render the vertex array using standard OpenGL triangle drawing techniques. Therefore, all the tessellation is performed by the processing card 26. That is, the processing card 26 'pre-tessellates' the DTED and effectively the only processing performed by the graphics card processor 50 is rendering the vertex array, thereby allowing the graphics card 30 to render the desired area to be viewed as quickly as possible.

Thus, the RTRAA provides 3-D terrain rendering and database management on existing low performance hardware, i.e. hardware currently installed on the mobile platform 18, with the performance required for fast-moving displays, e.g. helmet-mounted displays. Particularly, the RTRAA provides data management routines that efficiently move data from storage media to processors on an as-needed basis; data processing routines that provide a highly efficient level of detail control for multiple viewpoints; and rendering routines that allow real-time capability on low-performance hardware platforms. In various embodiments, the RTRAA provides efficient database management capable of processing several gigabytes of data to generate real-time 3D terrain rendering for fast-moving displays.

More specifically, the RTRAA provides such database management and real-time 3D terrain rendering that is capable of maintaining a display update rate of approximately 60 Hz. This means that all processing is generally completed within approximately 16.6667 ms per frame. Due to the large amount of data and the complex processing that needs to be performed for such displays, the real-time render assist system 10 separates the processing of data from the rendering of it.

Those skilled in the art can now appreciate from the foregoing description that the broad teachings of the present disclosure can be implemented in a variety of forms. Therefore, while this disclosure has been described in connection with particular examples thereof, the true scope of the present disclosure should not be so limited since other modifications will become apparent to the skilled practitioner upon a study of the drawings, specification and following claims.

What is claimed is:

1. A method for rendering a real-time conformal view of terrestrial body's terrain being traversed by an airborne mobile platform, said method comprising:
   determining an area of a terrestrial body to be traversed (ATBT) by a mobile platform;
   tessellating digital terrain elevation data (DTED) representative of a terrain of the ATBT using a processing card communicatively connected to an independent and separate graphics card, the processing card and the graphics card being embedded components of an onboard computer system (OCS) of the mobile platform;
   said tessellating DTED further comprising tessellating all of the available DTED pertaining to said ATBT;
   rendering the tessellated DTED separately from the tessellating of the DTED using the graphics card, on the display in the mobile platform being viewed by an operator of the mobile platform, the rendering on the display being a one-to-one correspondence with what the operator would see from out a window of the airborne mobile platform; and
   re-tessellating the DTED at a rate of substantially 60 times per second, and updating the rendering at a rate of substantially 60 frames per second such that said re-tessellating provides a continuous, real-time conformal view of the ATBT terrain, and such that there is substantially a one-to-one correspondence between what an operator of the mobile platform would see as the mobile platform traverses the ATBT and what the rendering illustrates.

2. The method of claim 1, further comprises storing DTED of at least a portion of the terrain of the terrestrial body into an external removable mass data storage device (ERMDSD) connectable to the OCS.

3. The method of claim 2, wherein tessellating the DTED comprises executing a base mesh routine to load the DTED representative of the ATBT into a first electronic storage device that is independent and separate from graphics card.

4. The method of claim 3, wherein tessellating the DTED comprises executing the base mesh routine to tessellated the DTED loaded into the first electronic storage device and load the tessellated data into a second electronic storage device included in the graphics card.

5. A system for rendering a real-time conformal view of terrestrial body's terrain being traversed by an airborne mobile platform, said system comprising:
   an onboard computer system (OCS) comprising embedded mobile platform components including at least one processing card, at least one random access memory (RAM) device and at least one graphics card,
   an external removable mass data storage device (ERMDSD) connectable to the OCS and adapted for storing digital terrain elevation data (DTED) tiles for at least a portion of a terrain of a terrestrial body;
   wherein the processing card comprises a processor adapted to execute a real-time rendering assist application (RTRAA) stored in the processing card to:
      dynamically repackage the DTED tiles into DETD chunks representative of an area of the terrestrial body to be traversed (ATBT) by the mobile platform;
      load all available data represented by the DTED chunks into an electronic storage device of the processing card;
      create a base mesh of root diamonds representative of the ATBT; and
      tessellate the root diamonds to create a plurality of leaf diamonds, the root diamonds derived from all of the available data represented by the DTED chunks and the base mesh being stored in the RAM device; and
   the graphics card comprises a processor that is separate from the processing card processor and adapted to use the tessellated DTED chunks and the base mesh to execute a rendering application included in the graphics card to render the leaf diamonds to generate a continuous, real-time conformal view of the ATBT, wherein the execution of the RTRAA and the execution of the rendering application are each repeated at a rate of substantially 60 frames per second to provide a real-time conformal view of the ATBT such that there is substantially a one-to-one correspondence between what an operator of the mobile platform would see looking out a window of the mobile platform as the mobile platform traverses the ATBT and what the rendering illustrates.

6. The system of claim 5, wherein the processing card processor is further adapted to execute a DTED subroutine of the RTRAA to load the required DTED tiles from the ERMDSD by returning pointers for the requested DETD tiles to a chunk subroutine of the RTRAA.

7. The system of claim 5, wherein the processing card processor is further adapted to execute a chunk subroutine of the RTRAA to dynamically repackage the DTED tiles into the DTED chunks that are interpretable by a rendering application of the graphics card.

8. The system of claim 5, wherein the processing card processor is further adapted execute a base mesh subroutine of the RTRAA to overlay each DTED chunk with a root diamond.

9. The system of claim 5, wherein the processing card processor is further adapted execute a base mesh subroutine of the RTRAA to compute a bounding sphere and an error value for each root diamond.

10. The system of claim 9, wherein the processing card processor is further adapted execute the base mesh subroutine to place each root diamond into one of a split queue and a merge queue in the RAM device based on the respective bounding sphere and error value for each root diamond.

11. The system of claim 5, wherein the processing card processor is further adapted execute a base mesh subroutine of the RTRAA to compute vertices for each leaf diamond and create a vertex array therefrom that is stored in processing card electronic storage device.

12. The system of claim 11, wherein the processing card processor is further adapted transfer the vertex array from the processing card electronic storage device to an electronic storage device of the graphics card in segments.

13. The system of claim 12, wherein the graphic card processor is further adapted executing the rendering application to render the vertex array stored in the graphics card electronic storage device to generate the real-time conformal view of the ATBT.

14. A method for rendering a real-time conformal view of terrestrial body's terrain being traversed by an airborne mobile platform, said method comprising:
   storing digital terrain elevation data (DTED) tiles for at least a portion of a terrain of a terrestrial body into an external removable mass data storage device (ERMDSD) connectable to an onboard computer system (OCS) of a mobile platform, the OCS comprising embedded mobile platform components including at least one processing card, at least one random access memory (RAM) device and at least one graphics card;

executing a real-time rendering assist application (RTRAA) stored in the processing card to dynamically repackage the DTED tiles into DETD chunks representative of an area of the terrestrial body to be traversed (ATBT) by the mobile platform and load the DTED chunks into an electronic storage device of the processing card;

executing the RTRAA to create a base mesh of root diamonds representative of the ATBT and tessellating the root diamonds to create a plurality of leaf diamonds, the root diamonds derived from all available data representing the DTED chunks, regardless of an altitude that said mobile platform is operating at, and the base mesh further being stored in the RAM device;

executing a rendering application included in the graphics card, separately from the execution of the RTRAA, and using the tessellated DTED chunks and the base mesh to render the leaf diamonds to generate a real-time conformal view of the ATBT, and re-executing each of the RTRAA and the rendering application to update the rendered leaf diamonds at a rate of substantially 60 Hz to provide a continuous, real-time conformal view of the ATBT terrain, and such that there is substantially a one-to-one correspondence between what an operator of the mobile platform would see as the mobile platform traverses the ATBT and what the rendering illustrates.

15. The method of claim 14, wherein executing the RTRAA to dynamically repackage the DTED tiles comprises executing a DTED subroutine of the RTRAA to load the required DTED tiles from the ERMDSD by returning pointers for the requested DETD tiles to a chunk subroutine of the RTRAA.

16. The method of claim 14, wherein executing the RTRAA to dynamically repackage the DTED tiles further comprises executing a chunk subroutine of the RTRAA to dynamically repackage the DTED tiles into the DTED chunks that are interpretable by a rendering application of the graphics card.

17. The method of claim 14, wherein executing RTRAA to create the base mesh of root diamonds comprises executing a base mesh subroutine of the RTRAA to overlay each DTED chunk with a root diamond.

18. The method of claim 14, wherein executing the RTRAA to tessellate the root diamonds comprises executing a base mesh subroutine of the RTRAA to compute a bounding sphere and an error value for each root diamond.

19. The method of claim 18, wherein executing the RTRAA to tessellate the root diamonds further comprises executing the base mesh subroutine to place each root diamond into one of a split queue and a merge queue in the RAM device based on the respective bounding sphere and error value for each root diamond.

20. The method of claim 14, wherein executing the RTRAA to tessellate the root diamonds comprises executing a base mesh subroutine of the RTRAA to compute vertices for each leaf diamond and create a vertex array therefrom that is stored in processing card electronic storage device.

21. The method of claim 20, wherein executing the RTRAA to tessellate the root diamonds further comprises transferring the vertex array from the processing card electronic storage device to an electronic storage device of the graphics card in segments.

22. The method of claim 21, wherein executing a rendering application to render the leaf diamonds comprises executing the rendering application to render the vertex array stored in the graphics card electronic storage device to generate the real-time conformal view of the ATBT.

* * * * *

UNITED STATES PATENT AND TRADEMARK OFFICE
CERTIFICATE OF CORRECTION

PATENT NO. : 7,612,775 B2  Page 1 of 1
APPLICATION NO. : 11/191621
DATED : November 3, 2009
INVENTOR(S) : Goyne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this

Nineteenth Day of October, 2010

David J. Kappos
*Director of the United States Patent and Trademark Office*